United States Patent Office 3,440,598
Patented Apr. 22, 1969

3,440,598

CONTRAST CONTROL CIRCUIT FOR THE INDICATION PROVIDED BY UNDERWATER SOUND APPARATUS

Hans Drenkelfort, Kiel-Elmschenhagen, and Siegfried Thieme, Schleswig-Holstein, Germany, assignors to Electroacustic G.m.b.H., Kiel, Germany, a corporation of Germany Filed Nov. 17, 1966, Ser. No. 595,256
Claims priority, application Germany, Nov. 29, 1965, E 30,560
Int. Cl. G01s 9/66
U.S. Cl. 340—3 14 Claims

ABSTRACT OF THE DISCLOSURE

A contrast control circuit connected with the amplifier stages of an amplifier comprises a time delay connected to the one of the amplifier stages for delaying the amplified object echo electrical signals and the amplified bottom echo electrical signals in time to provide time-delayed object echo electrical signals and time-delayed bottom echo electrical signals. A control unit is connected between the time delay and a record medium and reduces the magnitudes of the time-delayed bottom echo electric signals of amplified bottom echo electrical signals having magnitudes greater than a determined threshold level thereby reducing the magnitude of electricity applied to the record medium via the stylus thereof so that the shade of bottom echo indications on the echogram is lighter than and distinctly contrasted with the shade of floating object echo indications on the echogram. The control unit comprises a variable impedance connected between the time delay and the last of the amplifier stages for amplifying time-delayed electrical signals. The variable impedance reduces the magnitude of the time-delayed bottom echo electrical signals when the amplified electrical signals corresponding thereto and applied to the control unit have magnitudes greater than the determined threshold level.

The present invention relates to a contrast control circuit. More particularly, the invention relates to a contrast control circuit for the indication provided by underwater sound apparatus.

Underwater sound apparatus may utilize paper which is sensitive to electricity. A paper which is sensitive to electricity may comprise, for example, carbon paper provided with a cover layer of non-conductive material which may be more or less burned off by electrical sparks or electrical current to expose the black carbon layer so that such carbon layer becomes visible. In the underwater sound apparatus, a current conducting writing stylus is moved across the paper in accordance with time and produces in the foregoing manner a blackened area indicative of the amplitudes of received echo signals. The indication provided by the underwater sound apparatus, however, is incomplete. This is due to the fact that the indication includes very few distinguishable greys although the electrical signals indicated vary considerably in amplitude and amplitude ratios.

The sparsity of greys in the indication or carbon paper record creates considerable difficulties in an underwater sound system. In an underwater sound system, underwater transducers receive echo signals, previously transmitted underwater and reflected by objects underwater, and convert such echo signals into electrical signals. The electrical signals are then indicated by any suitable means such as, for example, by recording on carbon paper which is sensitive to electrical sparks. The sound echo signals produced by fish are very small in amplitude compared to the sound echo signals produced by the bottom or ocean floor, so that the indication or carbon paper record does not satisfactorily indicate the presence of fish in the water.

Many attempts have been made to improve the indication provided by underwater sound apparatus so that the presence of fish would be satisfactorily indicated. These attempts have been directed toward the receiver amplifier circuit of the underwater sound apparatus. In one arrangement, a two channel amplifier is provided, and the fish echoes and the lower amplitude portions of the bottom echoes are amplified in one channel and the remaining peak and higher amplitude portions of the bottom echoes are amplified in the other channel. The signals provided by both channels may be added or subtracted, as disclosed in German Patent No. 1,013,548. This arrangement does not effectively provide grey indication separation of the fish echoes from the adjacent portions of the bottom echoes.

In another arrangement, as disclosed in German Patent No. 1,136,248, the leading edge of the bottom is recorded as a narrow, black indication and the presence of fish is indicated by a relatively large variation of such indication.

This arrangement fails to separate the indication of fish from the indication of the bottom. This is especially the case during motion of the seas, because during such motion, the bottom is irregularly recorded and the fish echoes are lost in the irregularities.

In still another arrangement, as disclosed in U.S. Patent No. 2,433,382, series resistances are switched into and out of circuit in order to distinguish between the indications of various measuring instruments in the same trace. At best, this circuit reduces the dynamic scope of each measuring instrument by half, so that the indications provided are far from satisfactory.

On occasion, a cathode ray tube has been utilized as the indicator. The improvement was not complete and was therefore unsatisfactory. Furthermore, the tube did not provide a permanent record.

The principal object of the present invention is to provide a new and improved underwater sound system. The underwater sound system of the present invention includes a contrast control circuit for the indication provided by said system. The underwater sound apparatus of the present invention provides a satisfactory separation or distinction between fish echoes and bottom echoes. The distinction between fish echoes and bottom echoes provided by the underwater sound apparatus of the present invention is accomplished by simple structure, with efficiency, effectiveness and reliability, and without precluding the use of carbon paper or other paper sensitive to electricity. The underwater sound apparatus of the present invention completely distinguishes or separates fish from the bottom by providing a color difference between them in the indication. More particularly, the underwater sound apparatus of the present invention indicates fish as black and the bottom as grey. Details of the bottom are also indicated so that the structure of the bottom is evident and lobsters and the like, on the bottom, are indicated. Furthermore, the fish and the bottom are distinguished and separately indicated although the seas are in motion so that the depth of water varies.

In accordance with the present invention, underwater sound apparatus provides an echogram having a clear contrast between indications of floating objects such as fish and the bottom of a body of water such as an ocean. The underwater sound apparatus of the present invention comprises a transducer having an output and input positioned in the body of water for receiving object echo signals reflected from floating objects in the body of water and for receiving bottom echo signals reflected from the bottom of the body of water. The object echo signals have smaller magnitudes than the bottom echo signals. The transducer converts the object echo signals into object echo electrical signals of corresponding magnitudes and the bottom echo signals into bottom echo electrical signals of corresponding magnitudes. A recorder provides an echogram indicating in distinct contrast the presence of the floating objects and the bottom of the body of water. The recorder comprises a record medium responsive to electricity, a stylus in operation proximity with the record medium for applying electricity thereto and moving means coupled to the record medium and to the stylus for incrementally moving the record medium in a direction of motion and for moving the stylus across the record medium in directions transverse to the direction of motion. An amplifier is connected between the output of the transducer and the stylus of the recorder and amplifies the object echo and the bottom echo electrical signals and applies the amplified electrical signals to the stylus, thereby providing an echogram.

In accordance with the present invention, the amplifier comprises amplifier stages and a contrast control circuit interconnected with the amplifier stages. The contrast control circuit comprises time delay means connected to one of the amplifier stages for delaying the amplified object electrical signals and the amplified bottom echo electrical signals in time to provide time-delayed object echo electrical signals and time-delay bottom echo electrical signals, and control means connected between the time delay means and the recorder for reducing the magnitudes of the time-delayed bottom echo electrical signals of amplified bottom echo electrical signals having magnitudes greater than a determined threshold level, thereby reducing the magnitude of electricity applied to the record medium via the stylus thereof so that the shade of bottom echo indications on the echogram is lighter than and distinctly contrasted with the shade of floating object echo indications on the echogram.

The control means of the contrast control circuit of the present invention comprises a variable impedance connected between the time delay means and the last amplifier stage for reducing the magnitude of the time-delayed bottom echo electrical signals when the amplified electrical signals corresponding thereto and applied to the control means have magnitudes greater than the determined threshold level. The electrical signals are electrical voltages, the floating objects are fish, and the record medium of the recorder is sensitive to electrical current. A switch is connected to the variable impedance of the control means for selectively switching the variable impedance into and out of the contrast control circuit. The switch may be periodically operated under the control of the moving means of the recorder to periodically switch the variable impedance into and out of the contrast control circuit.

The underwater sound apparatus of the present invention further comprises a pulse transmitter for generating and transmitting an ultrasonic pulse into the body of water, and energizing means for the pulse transmitter coupled to the moving means of the recorder and connected to the variable impedance and to the pulse transmitter for making the variable impedance inoperative during operation of the pulse transmitter.

The time delay means of the contrast control circuit of the present invention imposes a time delay having a duration which provides a reduction of the magnitude of the time-delayed bottom electrical signal under the control of the corresponding echo electrical signal which is so time-delayed for a controlled portion of the time-delayed bottom echo electrical signal. The variable impedance of the control means comprises a transistor having emitter, collector and base electrodes and a resistor connected between the emitter and collector electrodes. The underwater sound apparatus of the present invention further comprises base means connected to the base electrode of the transistor for controlling the conductive condition thereof, and the bottom echo electrical signals are applied as an input voltage between the base and emitter electrodes of the transistor via the resistor and the reduced magnitude time-delayed bottom echo electrical signals are derived as an output voltage between the emitter and collector electrodes of the transistor via the resistor. The time delay means of the contrast control circuit imposes a time delay having a duration which, in cooperation with the base means, provides an output voltage which initially increases directly with increasing input voltage and then decreases substantially linearly with further increasing input voltage. The output voltage further increases directly with still further increasing input voltage due to the time delay and the base means. The resistance value of the resistor may be selected to provide the decrease of output voltage with further increasing input voltage abruptly and for a short duration prior to the further increase of the output voltage with the still further increasing input voltage.

In order that the present invention may be readily carried into effect, it will now be described with reference to the accompanying drawings, wherein.

Figures 1, 10:
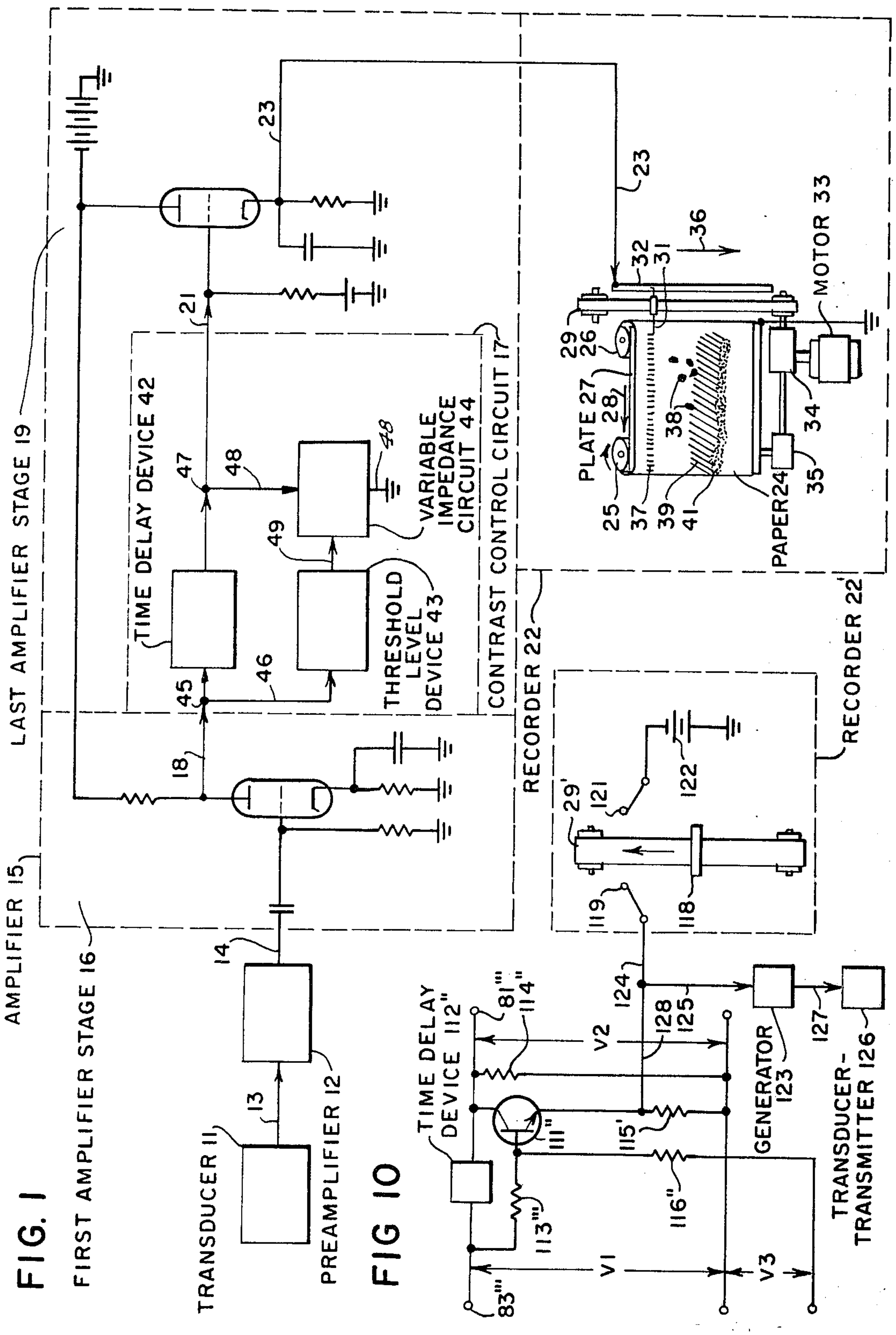
FIG. 1 is a block circuit diagram of an embodiment of underwater sound apparatus of the present invention including an embodiment of the contrast control circuit of the present invention.
FIG. 10 is a circuit diagram of another modification of the basic contrast control circuit of FIG. 5.

In FIG. 1, underwater sound apparatus includes a transducer 11 mounted in the hull of a seagoing vessel underwater. The transducer 11 converts sound energy impinging upon its diaphragm or membrane into electrical signals or oscillations. The electrical signals produced by the transducer 11 are fed to a preamplifier 12 via a lead 13. The preamplifier 12 amplifies the electrical signals and feeds, via a lead 14, the amplified signals to an amplifier 15 which further amplifies the electrical signals.

The amplifier 15 comprises a first amplifier stage 16 having an input connected to the preamplifier 12 via the lead 14, a contrast control circuit 17 having an input connected to the output of the first amplifier stage 16 via a lead 18, and a last amplifier stage 19 having an input connected to the output of the contrast control circuit 17 via a lead 21. There may be a plurality of amplifier stages interposed between the first amplifier stage 16 and the contrast control circuit 17. A recorder or indicator 22 is connected to the output of the last amplifier stage 19 via a lead 23.

The recorder 22 comprises current-sensitive paper 24 which is mounted on a pair of substantially parallel rollers 25 and 26 and is stretched across an electrically conductive grounded plate 27. The paper 24 is wound on the roller 25 as it is unwound from the roller 26, so that it moves across the plate 27 in the direction of an arrow 28. An endless belt 29 is mounted and moved perpendicularly to the direction of motion of the paper 24 and in the plane of said paper on the plate 27. The belt 29 is electrically non-conductive and mounts a writing stylus 31. The stylus 31 is electrically conductive and is energized by the last amplifier stage 19 via the lead 23 and a conductive strip or bus bar 32.

A motor 33, which may comprise an electric motor, drives the endless belt 29 via a gear coupling 34 and thereby drives the stylus 31. The motor 33 also moves the paper 24, in the direction of the arrow 28, in very small increments, via a stepping device 35. The stepping device 35 rotates the roller 25 in counterclockwise direction in increments such that the paper 24 is incrementally moved approximately a hairline each time it is moved.

The indication or echogram produced by the underwater sound apparatus is provided on the paper 24 by the writing stylus 31 by the movement of said stylus across said paper in the direction of an arrow 36. The echogram comprises a plurality of zero marks 37 extending substantially in linear spaced relation in the direction of the movement of the paper 24. Each zero mark 37 is produced at the beginning of a corresponding sound as a result of a pulse produced by a sound transmitter (not shown). The echo signals, received by the transducer 11 and converted therein and amplified in the preamplifier 12 and the amplifier 15, burn off the paper layer of the paper 24 via the writing stylus 31.

In the echogram, fish echoes are indicated in black as areas 38 and the ocean bottom is indicated in a grey area 39 and at its lower edge in a black area 41. The fish are thus clearly distinguished from the ocean bottom, regardless of the motion of the seas, and even if the fish are indicated at the bottom of the ocean because of breaks, fissures, crevices or the like in the ocean bottom. The highly desirable echogram is provided by the underwater sound apparatus of the present invention due to the contrast control circuit of the present invention.

The contrast control circuit 17 of the present invention has an input connected to the output of the first amplifier stage 16 via the lead 18 and an output connected to the input of the last amplifier stage 19 via the lead 21. The contrast control circuit 17 comprises a time delay device or circuit 42 connected in series between the leads 18 and 21. A threshold level device or circuit 43 is connected in series circuit arrangement with a variable impedance circuit 44. The threshold level device 43 is connected to the lead 18 at a point 45 via a lead 46. The variable impedance circuit 44 is connected in the lead 21 AB between the time delay device 42 and the recorder 22. The variable impedance circuit 44 is connected to a point at ground potential.

The threshold level set by the threshold level device 43 is so adjusted that only the relatively strong bottom echo signal is transferred through said threshold level device, and the fish echo signals, which are considerably weaker, are not so transferred. The portions of the bottom echo signal which exceed the threshold level in magnitude are transferred by the threshold level device 43 to the variable impedance circuit 44 via a lead 49 and are utilized to control the impedance of said variable impedance circuit.

The variable impedance circuit 44 normally has a high impedance, so that fish echo signals are amplified by the amplifier 15 and are indicated in the echogram as black areas. The variable impedance circuit 44 maintains its normally high impedance when fish echo signals are in the lead 18, because such fish echo signals are lower in amplitude or magnitude than the threshold level of the threshold level device 43 so that said threshold level device remains inoperative. The bottom echo signal has an amplitude or magnitude which exceeds the threshold level of the threshold level device 43. The portions of the bottom echo signals which exceed the threshold level are thus transferred by the threshold level device 43 to the variable impedance circuit 44 and reduce the impedance of said variable impedance circuit to a low impedance.

The time delay device 42 delays the bottom echo signal during the time that the impedance of the variable impedance circuit 44 is reduced to a low impedance. Thus, the low impedance of the variable impedance circuit 44 is provided before the bottom echo signal may be indicated as a black area on the echogram, so that the indication on the echogram of the bottom echo is considerably lighter in shade than the fish echo indications. The reduction of the impedance of the variable impedance circuit 44 reduces the voltage of the bottom echo signal provided by the time delay device 42, as will be hereinafter described.

The variable impedance circuit 44 functions as a leakage resistance which grounds an undesired share of the writing current. A portion of the current at the point 47 in the lead 21 flows to ground via the lead 48, as indicated by the arrowhead in said lead 48. Since the grounded portion of current is diverted from the last amplifier stage 19, and thus from the recorder 22, the writing on the echogram is grey, rather than white. The function of the variable impedance 44 as a leakage resistance occurs only when said impedance is reduced to a low impedance by a control voltage applied via the lead 49.

Figure 2:
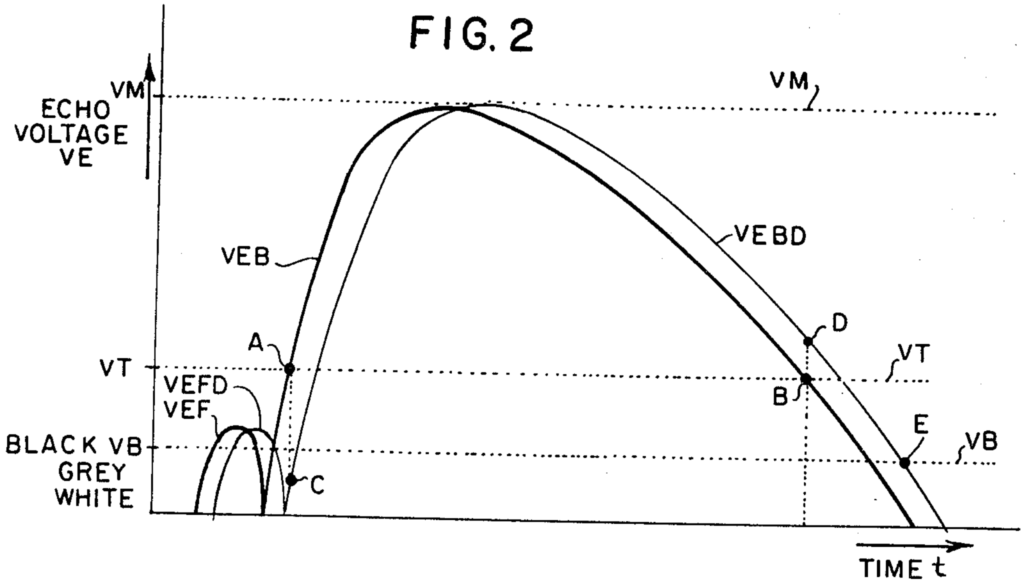
FIG. 2 is a graphical presentation of the echo voltage and the echo voltage as delayed in time by the contrast control circuit of the present invention.

In FIG. 2, the abscissa represents the time $t$ and the ordinate represents the echo voltage VE. The fish echo voltage VEF, the bottom echo voltage VEB, the time-delayed fish echo voltage VEFD and the time-delayed bottom echo voltage VEBD are shown in FIG. 2. The non-delayed echo voltages VEF and VEB are fed to the threshold level device 43 and are thus control voltages, whereas the time-delayed echo voltage VEBD requires adjustment for contrast control. The black voltage level VB, the threshold voltage level or threshold level VT, and the maximum amplitude VM of the bottom echo voltage VEB and the time-delayed bottom echo voltage VEBD are shown in FIG. 2.

The fish echo signal VEF and small portions of the bottom echo signal VEB are smaller in magnitude than the threshold level VT and are therefore blocked by the threshold level device 43 from reaching the variable impedance circuit 44. The fish echo signal VEF and the portions of the bottom echo signal VEB beneath the threshold level VT thus do not influence the time-delayed fish echo signal or voltage VEFD or the time-delayed bottom echo signal or voltage VEBD, and thus do not control the contrast of the echogram indications.

When the bottom echo voltage VEB includes portions which exceed the threshold level VT in magnitude, such as the portions extending from point A to point B of FIG. 2, then the time-delayed bottom echo voltage VEBD is varied in magnitude beginning from point C to prevent said time-delayed bottom echo voltage from reaching the black level VB in magnitude. The variation in magnitude of the time-delayed bottom echo voltage VEBD thus varies the black echogram indication of said voltage to a grey indication and is accomplished by the variable impedance circuit 44. The fish echoes of the echogram (FIG. 3) are thus indicated as black areas 38, whereas the bottom echo is indicated as a grey area 39 so that there is a considerable contrast between the fish echo and bottom echo indications.

Figure 3:
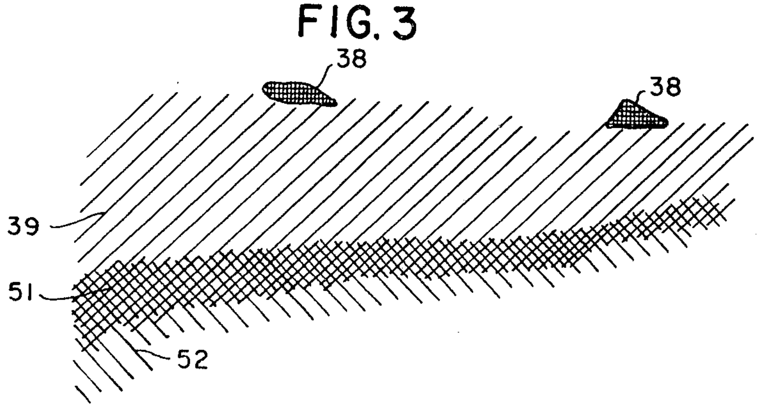
FIG. 3 is a diagram of an indication provided by the underwater sound apparatus of the present invention.

When the bottom echo voltage VEB decreases in magnitude beneath the point B, which is the threshold level, the variation of the time-delayed bottom echo voltage VEBD by the variable impedance circuit 44 is terminated and said time-delayed bottom echo voltage is fed as such to the recorder 22 from point D to the terminal point of said time-delayed bottom echo voltage. Since the point D on the time-delayed bottom echo voltage VEBD is higher in magnitude than the black level VB, the portion of said time-delayed bottom echo voltage between the point D and point E, which is at said black level, is indicated in the echogram as a black area 51 (FIG. 3). The remaining portion of the time-delayed bottom echo voltage VEBD from the point E to the terminal point of said voltage is then indicated in the echogram (FIG. 3) as a grey area 52, since such remaining portion is lower in magnitude than the black level VB.

There may be additional color or shade contrasts in the echogram, which are not shown in FIG. 3 in order to maintain the clarity of illustration. Such additional contrasts or indications may concern the structure of the ocean bottom. Thus, the black area 51 indicates the structure of the ocean bottom by its distance from the zero marks 37 (FIG. 1) of the echogram. This additional information is not provided by known apparatus and is valuable for catching fish which would otherwise be unrecognizable due to the fact that they are present in specific bottom structures, as well as in geological research. When the seas are in motion, so that the vessel carrying the underwater sound apparatus of the present invention is raised and lowered by such seas, the black fish indications 38 are distinctly contrasted with the grey bottom indications 39, as during calm seas. Heavy seas would disrupt the operation of apparatus of known type which indicates by line the distinction between fish and bottom.

Figure 4:
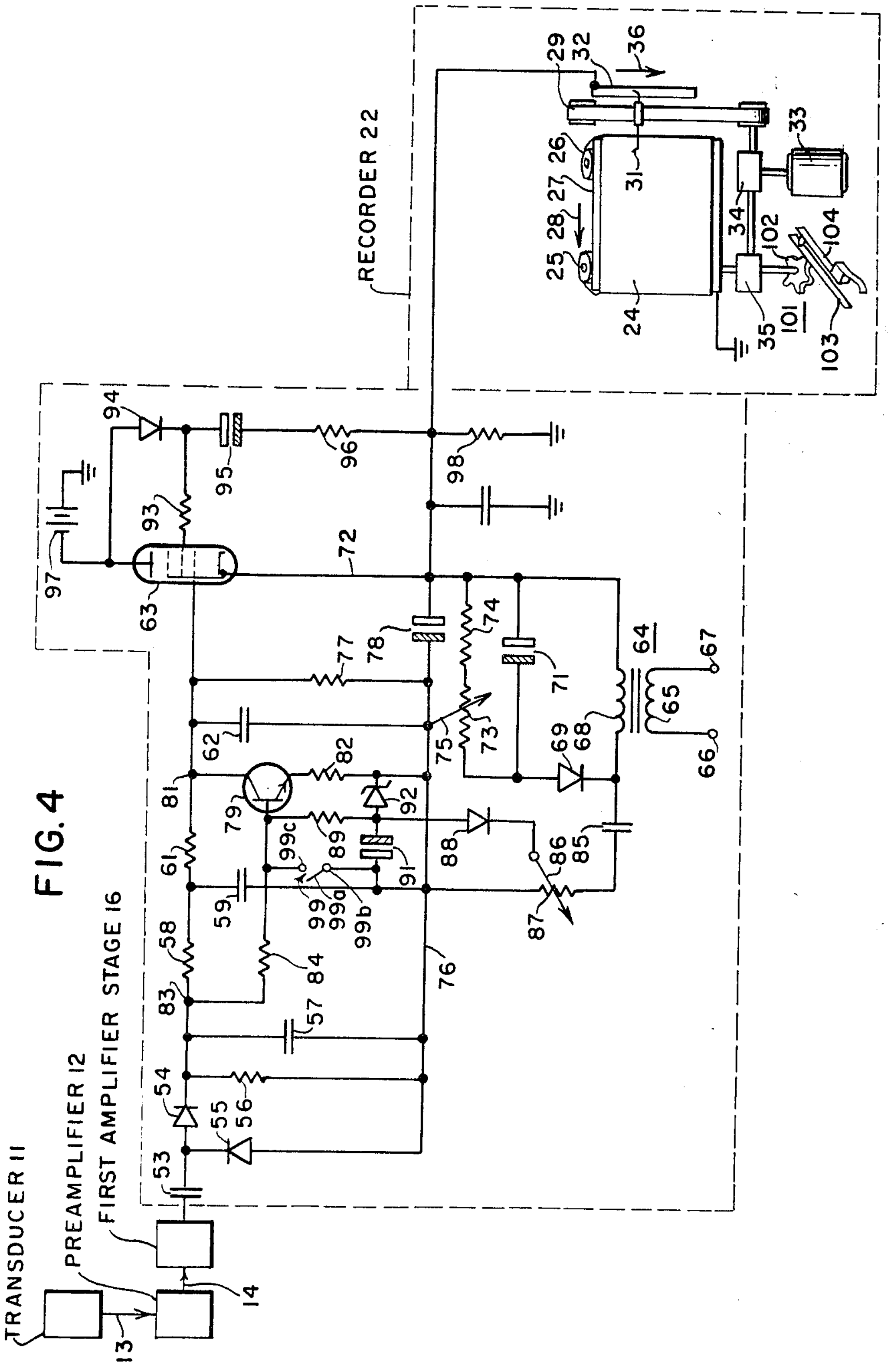
FIG. 4 is a circuit diagram of the contrast control circuit of FIG. 1 in the underwater sound apparatus of the present invention.

In FIG. 4, the transducer 11, the preamplifier 12 and the first amplifier stage 16 of the amplifier 15 are shown in block form, a circuit diagram of the remainder of the amplifier 15 of the underwater sound apparatus of the present invention is shown, and a schematic diagram of the recorder 22 is shown. The electrical signals or voltages corresponding to the fish echoes and the bottom echoes are amplified by the first amplifier stage 16 and are supplied to the remainder of the amplifier 15 (shown in a broken line block) via a coupling capacitor 53. The electrical signals are rectified by diodes 54 and 55, which are connected in series and in parallel, respectively, with the coupling capacitor 53.

The rectified signals are filtered by a filter connected to the diodes 54 and 55 and comprising a resistor 56 and a capacitor 57. The smoothed, rectified signals are then delayed in a time delay device comprising a pair of RC integrators which include a first resistor 58 and a first capacitor 59 and a second resistor 61 and a second capacitor 62. The first and second resistors 58 and 61 are connected in series between the filter 56, 57 and the control grid of a pentode 63, so that the time-delayed fish echo voltages and the time-delayed bottom echo voltages are applied to said control grid. The first capacitor 59 is connected in parallel with the first and second resistors 58 and 61 at a common point in the connection between said resistors and the second capacitor 62 is connected in parallel with said resistors at a common point in the connection between said second resistor and the control grid of the pentode 63.

The pentode 63 is biased by a transformer 64 having a primary winding 65 connected to an AC source via input terminals 66 and 67 and a secondary winding 68 connected to the cathode of said pentode. The output of the transformer 64 is rectified by a diode 69 connected to the secondary thereof and is filtered by a filter capacitor 71, connected in series with said diode, and is then applied to the cathode of the pentode 63 via a lead 72. The energizing voltage for the pentode 63 may be varied by a potentiometer 73, 74 connected in parallel with the filter capacitor 71, between the diode 69 and the lead 72. The potentiometer 73, 74 includes a variable resistor 73 having a movable resistance-varying arm 75 which is electrically connected to a ground lead 76. The grid bias voltage is thus applied to the control grid of the pentode 63 via the arm 75 of the potentiometer 73, 74 and a leakage resistor 77 after it is filtered by a filter capacitor 78 connected in the ground lead 76.

A transistor 79, having a base electrode, an emitter electrode, a collector electrode, a base-emitter path, a base-collector path and an emitter-collector path, is connected to a common point 81 in the connection between the second resistor 61 and the control grid of the pentode 63 and may be an NPN type transistor. The collector electrode of the transistor 79 is connected to the control grid of the pentode 63 via the common point 81. The emitter electrode of the transistor 79 is connected to the cathode of the pentode 63 via an emitter resistor 82, the filter capacitor 78 and the lead 72. The base electrode of the transistor 79 is connected to a common point 83 in the connection between the diode 54 and the first resistor 58 via a base resistor 84.

The transistor 79 is normally in its non-conductive or blocked condition due to a negative DC current supplied to the base electrode of said transistor by the transformer 64 via the secondary winding 68 of said transformer, a capacitor 85 connected in series with said secondary winding, the movable resistance-varying arm 86 of a potentiometer 87 connected in series between said capacitor and the ground lead 76, a diode 88 connected to said arm and a resistor 89 connected in series between said diode and the base electrode of said transistor. A filter capacitor 91, connected between a common point in the connection between the first capacitor 59 and the potentiometer 87 and a common point in the connection between the diode 88 and the resistor 89, smoothes the negative DC supplied to the transistor.

A Zener diode 92 is connected between a common point in the connection between the diode 88 and the resistor 89 and a common point in the connection between the emitter resistor 82 and the ground lead 76. The Zener diode functions to limit the base voltage of the transistor 79 in order to protect said transistor against overvoltage and to maintain a response to fish echo and bottom echo electrical signals. The negative potential applied to the base electrode of the transistor 79 may not exceed the Zener voltage, but may be less than said Zener voltage at a suitable adjustment of the potentiometer 87 and may finally become zero. The base electrode of the transistor 79 may also be controlled by the fish echo voltages and the bottom echo voltages provided by the filter 56, 57 via the common point 83.

The transistor 79 and its circuit thus operates as the variable impedance circuit 44 (FIG. 1) as well as the threshold level device 43 (FIG. 1). If the electrical voltage or signal at the common point 83 at the input to the time delay circuit 58, 59, 61, 62 has a magnitude which is greater than the base potential of the transistor 79, as determined by the Zener diode 92 or the adjustment of the potentiometer 87, the portion of such voltage greater than said base potential switches said transistor to its conductive or ON condition. The base potential of the transistor 79 is thus the threshold level.

The base potential of the transistor 79 is determined by either the potentiometer 87 or the Zener diode 92. Thus, only the relatively higher magnitude bottom echo voltage may exceed the base potential of the transistor 79. When a bottom echo voltage is applied to the base electrode of the transistor 79 and said transistor is thereby switched to its conductive condition, said transistor operates as a shunt for the time-delayed bottom echo voltage at the common point 81 and thereby considerably reduces the magnitude of said time-delayed bottom echo voltage. The time delay circuit 58, 59, 61, 62 is so adjusted that the reduction of the magnitude of the time-delayed bottom echo voltage commences at the beginning of the greater magnitude portions of the time-delayed bottom echo voltage, so that the entire greater magnitude portion of said voltage is suitably reduced in magnitude. Since the shade or degree of darkness of the indications provided on the echogram by the stylus varies with the amplitude or magnitude of the signal applied to said stylus, the reduction of the magnitude of the bottom echo voltage provides a grey indication for the bottom echo, rather than a black indication, which it would provide if it were not so reduced in magnitude. The grey bottom echo indications are thus clearly contrasted in the echogram with the fish echo indications.

Thus, since fishermen are primarily interested in fish, fish are indicated in black in contrast with the grey indication of the bottom. Fish which are present at the bottom in great numbers are also clearly contrasted with the bottom by being indicated in black while the bottom is indicated in grey. When the magnitude of the bottom echo voltage decreases below its greater magnitude portion, the bottom indication becomes darker than grey. When the magnitude of the bottom echo voltage decreases further, below the base potential of the transistor 79, the bottom indication becomes black. The transistor 79 is switched to its non-conductive or OFF condition. When the magnitude of the bottom echo voltage decreases still further to below the black level (FIG. 3) the bottom indication becomes lighter again.

The contrast control provided by the variable impedance effect of the transistor 79 may be enhanced or multiplied, if a similar transistor and accompanying circuit is also provided in the first amplifier stage 16. The contrast control may also be enhanced or multiplied if the pentode 63 is utilized, as shown in FIG. 4, and especially if special circuitry is utilized for said pentode. The suppressor grid of the pentode 63 is connected to its cathode. The screen grid of the pentode 63 is connected to its anode via a screen grid resistor 93 and a diode 94 connected in series with said resistor to said anode. The screen grid of the pentode 63 is connected to its cathode via the screen grid resistor 93 and a capacitor 95 and limiting resistor 96; said capacitor and said limiting resistor being connected in series with said screen grid resistor to said cathode. The limiting resistor 96 functions to limit the capacitor 95 charging current when said capacitor is charged by an anode biasing battery 97 via the diode 94 in the blocked condition of the pentode 63.

The screen grid resistor 93 limits the screen grid current in the area of the input and prevents an undesirably strong discharge of the capacitor 95. When a fish echo voltage is first applied to the control grid of the pentode 63, there is a decrease in the determining difference in potential between the anode and the cathode due to the voltage drop at cathode resistor 98. The capacitor 95 maintains the screen grid at a constant potential relative to the cathode, however, so that there is no indication of a reduction due to the pentode 63 being made conductive. The pentode 63 operates on a pentode characteristic which varies during a trailing portion of the signal applied to said pentode, because the capacitor 95 is discharged substantially through the screen grid. This decreases the screen grid voltage, the anode current and thus the steepness of the pentode characteristic. This enhances the almost black area 51 indication (FIG. 3) of the echogram, so that such area appears in the echogram as the next blackest indication of the echogram; the fish indication being the blackest.

The operator of the underwater sound apparatus, who may most likely be a fisherman, may, if desired, switch the contrast control portion of the circuit in and out of circuit as he wishes. This is accomplished by a switch 99 which is connected between the base electrode of the transistor 79 and the capacitor 91, so that it is connected between the resistor 84 and the ground lead 76. The switch 99 comprises a switch arm **99*a* connected to a first switch contact 99*b* and movable to selectively open and close an electrical circuit with a second switch contact 99*c*. When the switch 99 is open or OFF (as shown in FIG. 4) the circuit operates in the aforedescribed manner. When the switch 99 is closed or ON, with the switch arm 99*a* in electrical contact with the second switch contact 99*c*, then transistor 79** is short-circuited and is thus made inoperative, and the echogram is of the prior art type with poor contrast between the fish echo indications and the bottom echo indication.

In a modification of the embodiment of FIG. 4, the switching in and out of circuit of the transistor 79 may be periodic. Thus, the switch 99 may be closed or ON periodically for a period of time such as, for example, 20% of the sounding period, and the echogram indications may be of the prior art type. Five sounding periods may thus be indicated in the echogram with the switch 99 closed or ON, then twenty sounding periods may be indicated with said switch open or OFF, and then five sounding periods may be indicated with said switch closed or ON, and so on. This provides the new and greatly improved indications of the underwater sound apparatus of the present invention in alternation with the usual indications of the prior art, so that, altogether, more objects are recognizable.

The foregoing modification may also be accomplished, as shown in FIG. 4, by a cam-operated switch 101 which may be utilized with the recorder 22. The cam-operated switch 101 may comprise a cam 102, which is coupled to and driven by the stepping device 35 of the recorder 22, and an electrical switch having a flexible first arm 103 abutted by and periodically moved into electrical contact with a second arm 104. The arms 103 and 104 are connected in the transistor 79 circuit in any suitable manner in which they function as the switch 99 under automatic periodic control, although said arms are physically positioned in the recorder 22. The number of projections on the cam 102, as well as the shape and dimensions of such projections, determines the operations of the cam-operated switch 101. The cam-operated switch 101 may thus replace the switch 99.

Figures 5, 7, 8:
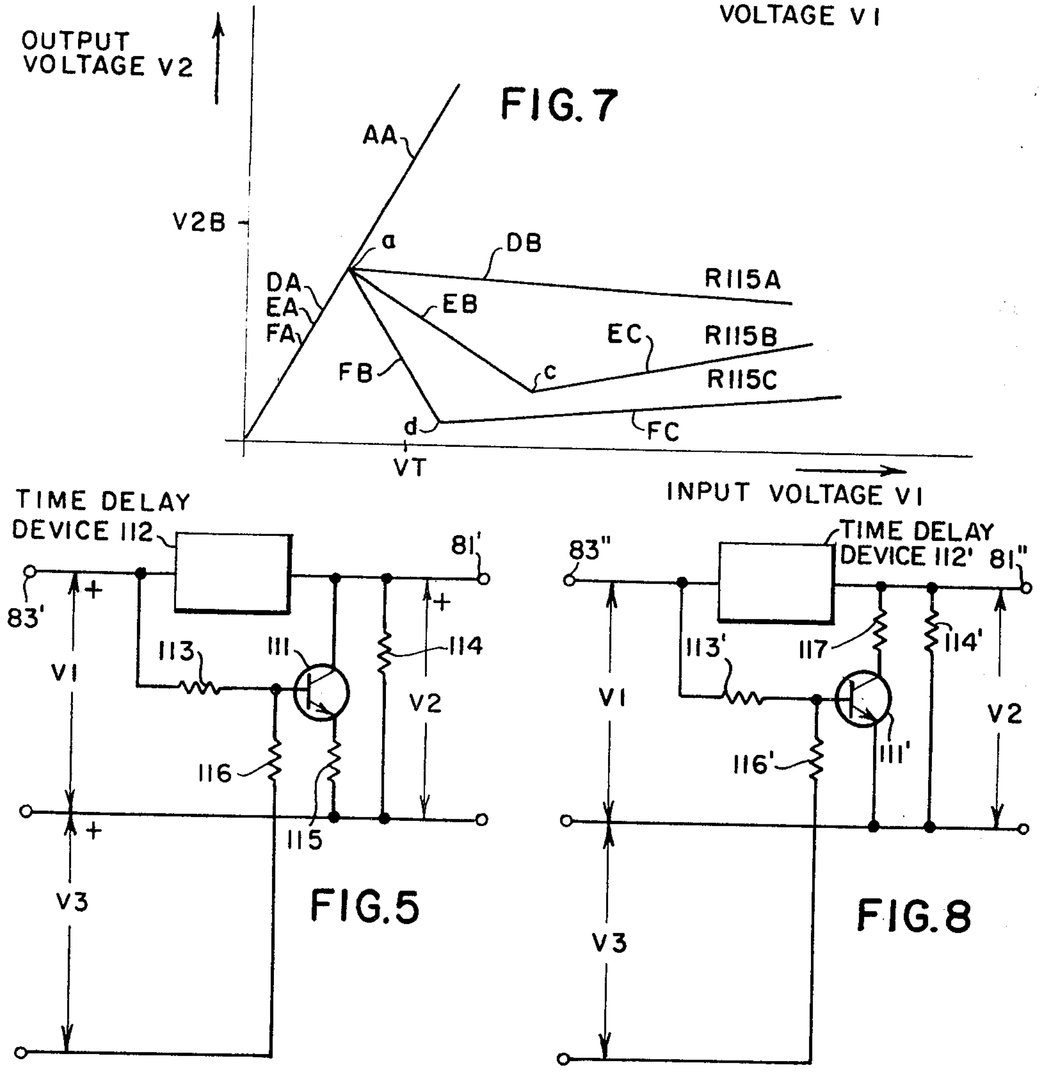
FIG. 5 is a circuit diagram of the basic contrast control circuit of FIG. 4.
FIG. 7 is a graphical presentation of the input voltage versus the output voltage of the basic contrast control circuit of FIG. 5 for different parameters.
FIG. 8 is a circuit diagram of a modification of the basic contrast control circuit of FIG. 5.

FIG. 5 is a circuit diagram of the basic contrast control circuit of FIG. 4. In FIG. 5, a transistor 111 and its basic circuit functions as the variable impedance circuit. The circuit points 81 and 83 of FIG. 4 are indicated in FIG. 5 as circuit points 81′ and 83′. A positive input voltage V1 derived from the echo voltage, fish or bottom, is applied to the circuit point 83′ and a positive output voltage V2 is derived from the circuit of FIG. 5 at the circuit point 81′. A time delay device 112 is connected in circuit in series between the circuit points 83′ and 81′. The time delay device 112 may comprise the resistor components shown in FIG. 4 and may appear as a resistance to the transistor 111.

A resistor 113 is connected between the circuit point 83′ and the base electrode of the transistor 111. A resistor 114 is connected between the circuit point 81′ and an emitter resistor 115. The emitter resistor 115 and the resistor 114 are thus connected in series between the emitter and collector electrodes of the transistor 111. The resistor 114 and the resistors of the time delay device 112 function together as a voltage divider, so that the output voltage V2 is smaller in magnitude than the input voltage V1, due to a ratio $R114/R112+R114$. The output voltage V2 is applied to a following stage, as shown in FIG. 4.

The transistor 111 may be the same as the transistor 79 and is thus of NPN type and may be switched to its nonconductive or OFF condition by a negative base voltage V3 via a base resistor 116 which is connected to a common point in the connection between the resistor 113 and the base electrode of said transistor. When the transistor 111 is in its non-conductive condition, it is an open circuit relative to the time delay device 112. The base potential of the transistor 111 is increased via the resistor 113 when the input voltage V1 increases. When a determined voltage magnitude, which is the threshold level, is exceed in magnitude by the input voltage V1, the transistor 111 is switched to its conductive or ON condition and conducts current so that the output voltage V2 is decreased or reduced in magnitude.

Figure 6:
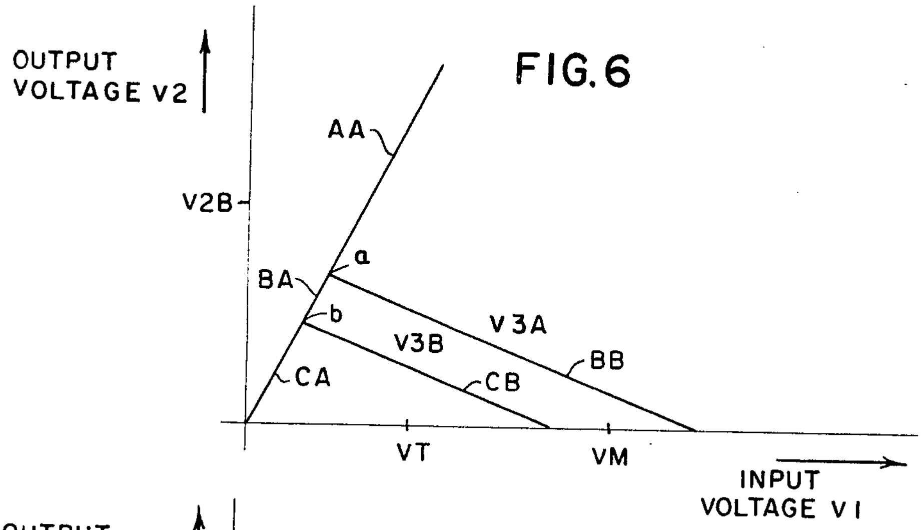
FIG. 6 is a graphical presentation of the input voltage versus the output voltage of the basic contrast control circuit shown in FIG. 5.

FIG. 6 shows the variation of the output voltage V2 with the input voltage V1. In FIG. 6, the abscissa represents the input voltage V1 and the ordinate represents the output voltage V2. The output voltage V2 is a function of the input voltage V1 and of the base voltage V3, which is the parameter in FIG. 6. In FIG. 6, the resistance value of the emitter resistor 115 is constant.

In FIG. 6, the curve AA is a positive slope or ascending amplification characteristic line for amplifying the fish echo voltage, which is unaffected by the contrast control circuit of the present invention, so that the magnitude of the output voltage V2 varies directly as the magnitude of the input voltage V1. The base voltage V3 may be varied and determines the threshold level VT. The current flowing through the transistor 111 increases in magnitude as the input voltage V1 increases further above the threshold level. Although the input and output voltages V1 and V2 vary throughout the sounding process, the base voltage V3 is constant during sounding, amplification and recording, but may be manually varied or adjusted.

In FIG. 6, the bottom echo voltage is amplified per an amplification curve BB for amplifying the bottom echo voltage; the curve BB having a parameter V3A and comprising a first line BA coincident with the curve AA to a point *a* and a second line BB extending from the point *a* in a negative slope or descending characteristic. The first line BA of the curve BB extends to the point *a* due to the delaying operation of the time delay device 112, because at the time represented by the point *a*, the transistor 111 commences to operate effectively to reduce the magnitude of the output voltage V2. The output voltage black level V2B is provided with a magnitude greater than the point *a* to insure that the bottom echo indication is grey in the echogram.

As shown in FIG. 2, the greater portion of the time-delayed bottom echo voltage VEBD extends from the point C to the point D. The portion of the bottom echo voltage VEBD from the point C to the point D (FIG. 2) follows the ascending characteristic of the first line BA from zero up to the voltage level represented by the point *a* and then follows the descending characteristic of the second line BB up to VM so that its indication on the echogram darkens until the point *a* and then gradually lightens until it is nearly white.

If the base voltage V3, and therefore the parameter, vary, so that the parameter is V3B, the bottom echo voltage is amplified per an amplification curve CC for amplifying the bottom echo voltage; the curve CC having such parameter and comprising a first line CA coincident with the curve AA to a point *b* and a second line CB extending from the point *b* in a negative slope or descending characteristic. The first line CA of the curve CC extends to the point *b* due to the delaying operation of the time delay device 112, because at the time represented by the point *b*, the transistor 111 commences to operate effectively to reduce the magnitude of the output voltage V2. The portion of the time-delayed bottom echo voltage VEBD from the point C to the point D (FIG. 2) follows the ascending characteristic of the first line CA up to the voltage level represented by the point *b* and then follows the descending characteristic of the second line CB, so that its indication on the echogram darkens until the point *b* and then gradually lightens until it is nearly white.

The longer the time delay period of the time delay device 112 (FIG. 5), the closer to zero along the ascending characteristic is the point *a* or *b* and the lighter the indication of the bottom echo at its lighter extremity. If the time delay period corresponds to that of the point *a*, the bottom echo indication on the echogram is lighter if the parameter is reduced by a decrease of the base voltage V3, as shown in FIG. 6. The emitter resistor 115 insures, during the conductive condition of the transistor 111, that the internal impedance of the transistor decreases substantially linearly as the magnitude of the input voltage V1 increases. Further conductivity of the transistor 111, after its initial switching to conductive condition, causes a linear decrease of the magnitude of the output voltage V2 as the input voltage V1 increases in magnitude. At a longer time delay, the time-delayed bottom echo voltage VEBD of FIG. 2 is shifted to the right and the magnitude of the point C decreases. The bottom echo voltage of the point C of FIG. 2 is the abscissa of FIG. 6 and provides the new point *a*.

Although the bottom echo indication VEBD of FIG. 2 of the echogram initially becomes darker in shade during the initial increase in magnitude of the input voltage V1 in the ascending characteristic of the bottom echo voltage curve, and thus varies positively, after the threshold level VT of FIG. 2 of the bottom echo control voltage VEB of FIG. 2 is exceeded by said input voltage, the bottom echo indication becomes lighter in shade during the continued increase in magnitude of said input voltage in the descending characteristic of the bottom echo voltage curve, and thus varies negatively. The point, *a* or *b*, of variation from positive to negative variation, depends upon the magnitude or amplitude of the bottom echo voltage.

The negative variations, indicated by the descending characteristic of the bottom echo voltage amplification characteristic curve, permits the indication in the echogram of a variation in amplitude of the bottom echo voltage. This may be indicated as a shade variation, although blackness may preclude the recognition of details due to the characteristics of the record medium or paper 24 (FIG. 4). Thus, greater contrast is provided between fish and bottom echo indications or the dynamic range is considerably enhanced without diminishing of the contrast by the contrast control circuit of the present invention. Furthermore, since there is a lapse of time between the application of the input voltage V1 and the switching of the transistor to its conductivity condition, the reduction of the magnitude of the bottom echo voltage commences shortly after the bottom echo voltage appears, so that the bottom echo indication of the echogram is never black, but is a grey shade which is lighter than the black indication of the fish echoes from the beginning.

The slope or steepness of the descending characteristic of the bottom echo curve, starting at the point *a* or the point *b* (FIG. 6), depends upon the resistance of the emitter resistor 115 (FIG. 5). FIG. 7 shows the variation of the output voltage V2 with the input voltage V1. In FIG. 7, as in FIG. 6, the abscissa represents the input voltage V1 and the ordinate represents the output voltage V2. In FIG. 7, the base voltage V3 is constant and the output voltage V2 is a function of the input voltage V1 and of the resistance of the emitter resistor 115, which is the parameter in FIG. 7.

In FIG. 7, the curve AA is, as in FIG. 6, a positive slope or ascending amplification characteristic line for amplifying the fish echo voltage, which is unaffected by the contrast control circuit of the present invention, so that the magnitude of the output voltage V2 varies directly as the magnitude of the input voltage V1. In FIG. 7, the bottom echo voltage is amplified per amplification curves DD, EE and FF for amplifying the bottom echo voltage; the curves DD, EE and FF having parameters R115A, R115B and R115C, respectively. The curve DD comprises a first line DA coincident with the curve AA to the point *a* and a second line DB extending from the point *a* in a negative slope or descending characteristic. The curve EE comprises a first line EA coincident with the curve AA to the point *a*, a second line EB extending from the point *a* to a point *c* in a negative slope or descending characteristic, and a third line EC extending from the point *c* in a positive slope or ascending characteristic. The curve FF comprises a first line FA coincident with the curve AA to the point *a*, a second line FB extending from the point *a* to a point *d* in a negative slope or descending characteristic, and a third line FC extending from the point *d* in a positive slope or ascending characteristic.

The output voltage black level V2B is provided with a magnitude greater than the point *a* to insure that the bottom echo indication is grey in the echogram.

If the transistor 111 is in its fully conductive condition, at the point *c* or the point *d*, in which a maximum magnitude of current flows through it, the emitter resistor 115 is directly parallel with the resistor 114 and the ascending characteristic of the third line of each of the curves EE and FF commences. The ascending characteristic of the third line of the bottom echo voltage amplification characteristic curve provides a darkening of the shade of the bottom echo indication on the echogram, as does the ascending characteristic of the first line thereof. Thus, a narrow area of darker or blacker shade is provided in the bottom echo indication of the echogram.

The ascending characteristic of the third line of the bottom echo voltage amplification characteristic curve is preferably independent from the descending characteristic of the second line of said bottom echo voltage amplification characteristic curve, as far as slope is concerned. The descending characteristic of the second line of the bottom echo voltage is preferably as steep as possible with as great a negative slope as possible whereas the ascending characteristic of the third line of said bottom echo voltage amplification characteristic curve is preferably of a positive slope which is not as great or as steep as that of said second line and is clearly different in slope from the slope of said second line. This is accomplished by the circuit modification of FIG. 8.

FIG. 8 and FIG. 5 are identical, except that in FIG. 8 a collector resistor 117 is connected to the collector electrode of the transistor 111', instead of the emitter resistor 115 of FIG. 5, which is connected to the emitter electrode of the transistor 111. In FIG. 8, the resistor 114' is connected between the circuit point 81'' and the emitter electrode of the transistor 111' and the collector resistor 117 is connected between said circuit point and the collector electrode of said transistor. The resistor 114' and the collector resistor 117 are thus connected in series between the emitter and collector electrodes of the transistor 111'. The collector resistor 117 prevents the negative feedback provided by the emitter resistor 115 of FIG. 5. Thus, the transistor 111' is normally maintained in its non-conductive or OFF condiiton by the base voltage V3 and may be very rapidly switched to its fully conductive condition, in which it conducts a maximum magnitude of current. When the transistor 111' is in its fully conductive condition, the collector resistor 117 is substantially the only resistance in parallel with the resistor 114' and the output voltage V2 decreases to a considerably smaller magnitude than its previous magnitude.

Initially, the output voltage V2 increases in direct proportion with the increase of the input voltage V1. When the transistor 111' is in its fully conductive condition, the output voltage V2 decreases abruptly, as the input voltage V1 increases. After the output voltage V2 has decreased to a specific point, further increase of the input voltage V1 produces an increase of the output voltage at a lesser rate than prior to the abrupt decrease in output voltage. The time delay device 112' and the base voltage V3, which detetermines the threshold level, thus function to reduce the magnitude of the bottom echo voltage in the aforedescribed manner to provide a grey bottom echo indication in the echogram so that the black fish echo indications are clearly contrasted with the bottom echo indication. This operation, of the modified circuit of FIG. 8, is illustrated in FIG. 9.

Figure 9:
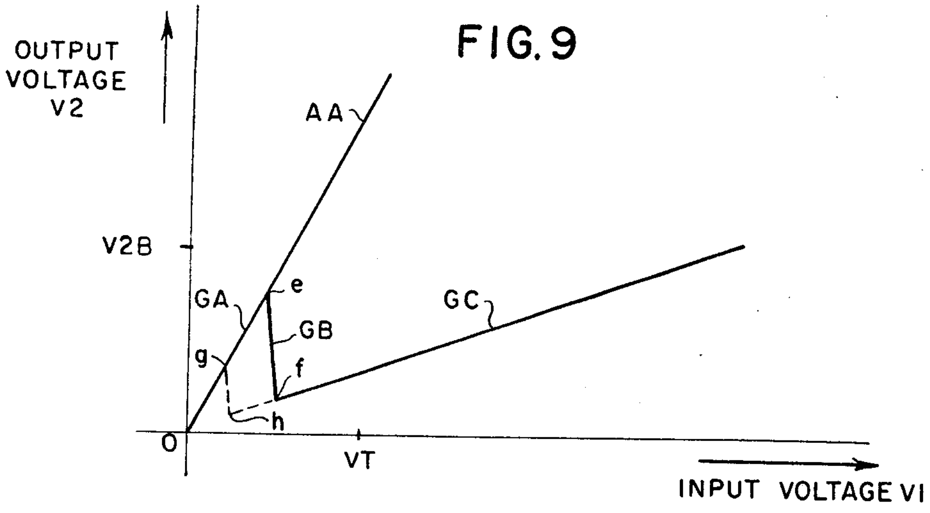
FIG. 9 is a graphical presentation of the input voltage versus the output voltage of the basic contrast control circuit shown in FIG. 8.

FIG. 9 shows the variation of the output voltage V2 with the input voltage V1 of the circuit of FIG. 8. In FIG. 9, as in FIGS. 6 and 7, the abscissa represents the input voltage V1 and the ordinate represents the output voltage V2. In FIG. 9, the output voltage V2 is a function of the input voltage V1. In FIG. 9, as in FIGS. 6 and 7, the curve AA is a positive slope or ascending amplification characteristic line for amplifying the fish echo voltage, which is unaffected by the contrast control circuit of the present invention, so that the magnitude of the output voltage V2 varies directly as the magnitude of the input voltage V1.

In FIG. 9, the bottom echo voltage is amplified per an amplification curve GG for amplifying the bottom echo voltage; the curve GG comprising a first line GA coincident with the curve AA to the point *e*, a second line GB extending from the point *e* to a point *f* in a negative slope or descending characteristic, and a third line GC extending from the point *f* in a positive slope or ascending characteristic. The output voltage black level V2B is provided with a magnitude greater than the point *e* to insure that the bottom echo indication is grey in the echogram. Due to the considerable steepness or slope of the descending characteristic of the second line GB, said second line is gone in a very short time and is substantially not evident in the bottom echo indication of the echogram. The slope of the descending characteristic of the second line GB may be varied as desired, however, so that it may, if desired, appear in the echogram.

Each of the curves AA, BB, CC, DD, EE, FF and GG of FIGS. 6, 7 and 9 thus represents the amplification characteristic of the amplifier for amplifying the corresponding fish or bottom echo voltage.

The shade of grey at the start of the bottom echo indication of the echogram may be determined by the duration of the time delay imposed by the time delay device 112' (FIG. 8). The time delay device 112' may thus be a variable time delay device. If the duration or period of the time delay is longer than that which corresponds to the descending characteristic of the second line GB of the bottom echo voltage curve GG, said second line is repositioned to extend from a point *g* to a point *h*, thereby considerably reducing its duration, but maintaining the same slope.

FIG. 10 is another modification of the basic contrast control circuit of FIG. 5. The modified circuit of FIG. 10 functions to provide, from a plurality of pulses, a plurality of zero marks such as, for example, the zero marks 37 on the paper 24 of the recorder 22 of FIG. 1. The zero marks 37 (FIG. 1) are usually provided on the echogram by a portion of a transmission pulse received by the receiving equipment. Since the pulse portions utilized to provide the zero marks are amplified in the first amplifier stage 16 (FIG. 4), they provide grey indications of zero marks in the echogram due to their high amplitude or magnitude and due to the operation of the contrast control circuit of the present invention.

In the circuit of FIG. 10, the contrast control operation is made inoperative for a determined period of time. This is accomplished by switching the transistor 111'' to its non-conductive or OFF condition for a determined period of time by applying an additional positive pulse to the emitter electrode of said transistor for said determined period of time. Thus, during such determined period of time a high amplitude positive pulse applied to the base electrode of the transistor 111'' cannot switch said transistor to its conductive condition, so that the contrast control circuit is inoperative for said determined period of time despite a high amplitude input voltage V1. The zero marks are thus indicated on the echogram as thick black marks.

The additional positive pulse applied to the emitter electrode of the transistor 111'' may be provided by the recorder 22'. Thus, for example, an electrically conductive contact member 118 may be mounted on the electrically insulative endless belt 29', which supports the writing stylus (not shown in FIG. 10), and may rotate with said belt. When the contact member 118 passes between and abuts a pair of spaced electrical contacts 119 and 121 it closes a circuit to a source 122 of positive pulses. The spaced contacts 119 and 121 are fixedly mounted on each side of the endless belt 29', but are spaced therefrom. The source 122 of positive pulses may comprise any suitable source of positive pulses such as, for example, a generator, oscillator or a battery, as shown, which provides a positive pulse which is utilized to trigger a generator 123 via leads 124 and 125.

The generator 123 is connected to a transducer-transmitter 126 via a lead 127. The transducer-transmitter 126 produces an ultrasonic pulse for each pulse or signal supplied to it by the generator 123 and transmits such ultrasonic pulse through the water. At the same time, the battery 122 and contacts 119 and 121 supply the positive blocking pulse or signal to the emitter electrode of the transistor 111'' via the lead 124 and a lead 128. The positive blocking pulse supplied to the emitter electrode of the transistor 111'' maintains said transistor in its non-conductive or OFF condition for the period of time that the transducer-transmitter 126 transmits pulses through the water.

The positive blocking pulse supplied to the emitter electrode of the transistor 111' are also supplied to the generator 123 via the leads 124 and 125 and start the operation of said generator. The generator 123 then operates the transducer-transmitter 126 to produce and transmit an ultrasonic pulse.

The underwater sound apparatus of the present invention is not limited, of course, to the disclosed embodiments. Thus, for example, any suitable electrically sensitive paper or paper of suitable sensitivity may be utilized instead of carbon paper, as the record medium or paper 24 (FIGS. 1 and 4). The record medium or paper 24 (FIGS. 1 and 4) may comprise any suitable material or combination of materials which provides a suitable range of shade gradations to accommodate the scope of signals to be indicated in the echogram. Furthermore, the recorder 22 (FIGS. 1 and 4) may comprise any suitable recording or indicating instrument such as, for example, cathode-ray tube apparatus, rather than the stylus writing equipment disclosed. If cathode-ray tube apparatus is utilized as the recorder, bottom echo signals having too high an amplitude or magnitude would provide indications which extend beyond the frame of the viewing face of the cathode-ray tube if the amplifier stages are adjusted to provide a high amplification of input signals. The bottom echo signals may be correspondingly reduced in amplitude, however, by a reduction of the amplification factor of the amplifier stages, to prevent the extension of the bottom echo indications beyond the frame of the viewing face of the cathode-ray tube without adversely affecting the structural details of the indications.

While the invention has been described by means of specific examples and in specific embodiments, we do not wish to be limited thereto, for obvious modifications will occur to those skilled in the art without departing from the spirit and scope of the invention.

We claim:

1. Underwater sound apparatus for providing an echogram having a clear contrast between indications of floating objects and the bottom of a body of water, said underwater sound apparatus comprising:

transducer means having an output and an input positioned in said body of water for receiving object echo signals reflected from floating objects in said body of water and for receiving bottom echo signals reflected from the bottom of said body of water, said object echo signals having considerably smaller magnitudes than said bottom echo signals, and for converting said object echo signals into object echo electrical signals of corresponding magnitudes and said bottom echo signals into bottom echo electrical signals of corresponding magnitudes;

recording means for providing an echogram indicating in distinct contrast the presence of said floating objects and the bottom of said body of water, said recording means comprising a record medium responsive to electricity, stylus means in operative proximity with said record medium for applying electricity thereto and moving means coupled to said record medium and to said stylus means for incrementally moving said record medium in a direction of motion and for moving said stylus means across said record medium in directions transverse to said direction of motion; and amplifier means connected between the output of said transducer means and the stylus means of said recording means for amplifying said object echo and said bottom echo electrical signals and for applying the amplified electrical signals to said stylus means thereby providing an echogram, said amplifier means comprising amplifier stages and contrast control circuit means interconnected with said amplifier stages, said contrast control circuit means comprising threshold level means connected to one of said amplifier stages for transferring portions of electrical signals having magnitudes greater than a determined threshold level and for blocking portions of electrical signals having magnitudes less than said determined threshold level and time delay means connected in a common connection of said threshold level means and said recording means for delaying the amplified object echo electrical signals and the amplified bottom echo electrical signals in time for a period in which said amplified bottom echo electrical signals increase to said determined threshold level to provide time-delayed object echo electrical signals and time-delayed bottom echo electrical signals which begin before the corresponding non-delayed bottom echo electrical signals reach said determined threshold level and control means connected between said time delay means and said recording means and controlled by the transferred portions of electrical signals for reducing the magnitudes of the time-delayed bottom echo electrical signals nearest their beginning thereby reducing the magnitude of electricity applied to said record medium via the stylus means thereof below a black voltage level so that the shade of bottom echo indications on said echogram from the beginning is lighter than and distinctly contrasted with the nearest shade of floating object echo indications on said echogram.

2. Underwater sound apparatus as claimed in claim 1, wherein the control means of the contrast control circuit means of said amplifier means comprises variable impedance means connected between said time delay means and said recording means for reducing the magnitude of said time-delayed bottom echo electrical signals when the amplified electrical signals corresponding thereto and applied to said control means have magnitudes greater than said determined threshold level.

3. Underwater sound apparatus as claimed in claim 1, wherein the control means of the contrast control circuit means of said amplifier means comprises variable impedance means connected between said time delay means and said recording means for reducing the magnitude of said time-delayed bottom echo electrical signals when electrical signals are transferred thereto via said threshold level means.

4. Underwater sound apparatus as claimed in claim 1, wherein said floating objects comprise fish and said electrical signals are electrical voltages, the record medium of said recording means being sensitive to electrical current.

5. Underwater sound apparatus as claimed in claim 2, further comprising switch means connected to the variable impedance means of said control means for selectively switching said variable impedance means into and out of said contrast control circuit means.

6. Underwater sound apparatus as claimed in claim 5, further comprising means coupled to the moving means of said recording means for periodically switching said switching means to periodically switch said variable impedance means into and out of said contrast control circuit means.

7. Underwater sound apparatus as claimed in claim 2, further comprising pulse transmitting means for generating and transmitting an ultrasonic pulse into said body of water, and energizing means for said pulse transmitting means coupled to the moving means of said recording means and connected to said variable impedance means and to said pulse transmitting means for making said variable impedance means inoperative during operation of said pulse transmitting means.

8. Underwater sound apparatus for providing an echogram having a clear contrast between indications of floating objects and the bottom of a body of water, said underwater sound apparatus comprising:

transducer means having an output and an input positioned in said body of water for receiving object echo signals reflected from floating objects in said body of water and for receiving bottom echo signals reflected from the bottom of said body of water, said object echo signals having smaller magnitudes than said bottom echo signals, and for converting said object echo signals into object echo electrical sigtrical signals of corresponding magnitudes and said bottom echo signals into bottom echo electrical signals of corresponding magnitudes;

recording means for providing an echogram indicating in distinct contrast the presence of said floating objects and the bottom of said body of water, said recording means comprising a record medium responsive to electricity, stylus means in operative proximity with said record medium for applying electricity thereto and moving means coupled to said record medium and to said stylus means for incrementally moving said record medium in a direction of motion and for moving said stylus means across said record medium in directions transverse to said direction of motion; and amplifier means connected between the output of said transducer means and the stylus means of said recording means for amplifying said object echo and said bottom echo electrical signals and for applying the amplified electrical signals to said stylus means thereby providing an echogram, said amplifier means comprising amplifier stages and contrast control circuit means interconnected with said amplifier stages, said contrast control circuit means comprising time delay means connected to one of said amplifier stages for delaying the amplified object echo electrical signals and the amplified bottom echo electrical signals in time to provide time-delayed object echo electrical signals and time-delayed bottom echo electrical signals and control means connected between said time delay means and the recording means for reducing the magnitudes of the time-delayed bottom echo electrical signals of amplified bottom echo electrical signals having magnitudes greater than a determined threshold level thereby reducing the magnitude of electricity applied to said record medium via the stylus means thereof so that the shade of bottom echo indications on said echogram is lighter than and distinctly contrasted with the shade of floating object echo indications on said echogram, said control means comprising variable impedance means connected between said time delay means and the last of the amplifier stages for amplifying time-delayed electrical signals, said variable impedance means reducing the magnitude of said time-delayed bottom echo electrical signals when the amplified electrical signals corresponding thereto and applied to said control means have magnitudes greater than said determined threshold level, another of said amplifier stages being connected between said contrast control circuit means and said recording means and comprising a pentode having a screen grid, a cathode and an anode, and a diode connected between said screen grid and said anode and a capacitor connected between said screen grid and said cathode.

9. Underwater sound apparatus for providing an echogram having a clear contrast between indications of floating objects and the bottom of a body of water, said underwater sound apparatus comprising:

transducer means having an output and an input positioned in said body of water for receiving object echo signals reflected from floating objects in said body of water and for receiving bottom echo signals reflected from the bottom of said body of water, said object echo signals having smaller magnitudes than said bottom echo signals, and for converting said object echo signals into object echo electrical signals of corresponding magnitudes and said bottom echo signals into bottom echo electrical signals of corresponding magnitudes;

recording means for providing an echogram indicating in distinct contrast the presence of said floating objects and the bottom of said body of water, said recording means comprising a record medium responsive to electricity, stylus means in operative proximity with said record medium for applying electricity thereto and moving means coupled to said record medium and to said stylus means for incrementally moving said record medium in a direction of motion and for moving said stylus means across said record medium in directions transverse to said direction of motion; and amplifier means connected between the output of said transducer means and the stylus means of said recording means for amplifying said object echo and said bottom echo electrical signals and for applying the amplified electrical signals to said stylus means thereby providing an echogram, said amplifier means comprising amplifier stages and contrast control circuit means interconnected with said amplifier stages, said contrast control circuit means comprising time delay means connected to one of said amplifier stages for delaying the amplified object echo electrical signals and the amplified bottom echo electrical signals in time to provide time-delayed object echo electrical signals and time-delayed bottom echo electrical signals and control means connected between said time delay means and said recording means for reducing the magnitudes of the time-delayed bottom echo electrical signals of amplified bottom echo electrical signals having magnitudes greater than a determined threshold level thereby reducing the magnitude of electricity applied to said record medium via the stylus means thereof so that the shade of bottom echo indications on said echogram is lighter than and distinctly contrasted with the shade of floating object echo indications on said echogram, said control means comprising transistor means connected between said time delay means and the last of the amplifier stages for amplifying time-delayed electrical signals, said transistor means reducing the magnitude of said time-delayed bottom echo electrical signals when the amplified electrical signals corresponding thereto and applied to said control means have magnitudes greater than said determined threshold level.

10. Underwater sound apparatus for providing an echogram having a clear contrast between indications of floating objects and the bottom of a body of water, said underwater sound apparatus comprising:

transducer means having an output and an input positioned in said body of water for receiving object echo signals reflected from floating objects in said body of water and for receiving bottom echo signals reflected from the bottom of said body of water, said object echo signals having smaller magnitudes than said bottom echo signals, and for converting said object echo signals into object echo electrical signals of corresponding magnitudes and said bottom echo signals into bottom echo electrical signals of corresponding magnitudes;

recording means for providing an echogram indicating in distinct contrast the presence of said floating objects and the bottom of said body of water, said recording means comprising a record medium responsive to electricity, stylus means in operative proximity with said record medium for applying electricity thereto and moving means coupled to said record medium and to said stylus means for incrementally moving said record medium in a direction of motion and for moving said stylus means across said record medium in directions transverse to said direction of motion; and amplifier means connected between the output of said transducer means and the stylus means of said recording means for amplifying said object echo and said bottom echo electrical signals and for applying the amplified electrical signals to said stylus means thereby providing an echogram, said amplifier means comprising amplifier stages and contrast control circuit means interconnected with said amplifier stages, said contrast control circuit means comprising time delay means connected to one of said amplifier stages for delaying the amplified object echo electrical signals and the amplified bottom echo electrical signals in time to provide time-delayed object echo electrical signals and time-delayed bottom echo electrical signals and control means connected between said time delay means and said recording means for reducing the magnitudes of the time-delayed bottom echo electrical signals for amplified bottom echo electrical signals having magnitudes greater than a determined threshold level thereby reducing the magnitude of electricity applied to said record medium via the stylus means thereof so that the shade of bottom echo indications on said echogram is lighter than and distinctly contrasted with the shade of floating object echo indications on said echogram, said control means comprising variable impedance means connected between said time delay means and the last of the amplifier stages for amplifying time-delayed electrical signals, said variable impedance means reducing the magnitude of said time-delayed bottom echo electrical signals when the amplified electrical signals corresponding thereto and applied to said control means have magnitudes greater than said determined threshold level, said variable impedance means comprising a transistor having emitter, collector and base electrodes and a resistor connected between said emitter and collector electrodes.

11. Underwater sound apparatus for providing an echogram having a clear contrast between indications of floating objects and the bottom of a body of water, said underwater sound apparatus comprising:

transducer means having an output and an input positioned in said body of water for receiving object echo signals reflected from floating objects in said body of water and for receiving bottom echo signals reflected from the bottom of said body of water, said object echo signals having smaller magnitudes than said bottom echo signals, and for converting said object echo signals into object echo electrical signals of corresponding magnitudes and said bottom echo signals into bottom echo electrical signals of corresponding magnitudes;

recording means for providing an echogram indicating in distinct contrast the presence of said floating objects and the bottom of said body of water, said recording means comprising a record medium responsive to electricity, stylus means in operative proximity with said record medium for applying electricity thereto and moving means coupled to said record medium and to said stylus means for incrementally moving said record medium in a direction of motion and for moving said stylus means across said record medium in directions transverse to said direction of motion;

amplifier means connected between the output of said transducer means and the stylus means of said recording means for amplifying said object echo and said bottom echo electrical signals and for applying the amplified electrical signals to said stylus means thereby providing an echogram, said amplifier means comprising amplifier stages and contrast control circuit means interconnected with said amplifier stages, said contrast control circuit means comprising time delay means connected to one of said amplifier stages for delaying the amplified object echo electrical signals and the amplified bottom echo electrical signals in time to provide time-delayed object echo electrical signals and time-delayed bottom echo electrical signals and control means connected between said time delay means and said recording means for reducing the magnitudes of the time-delayed bottom echo electrical signals of amplified bottom echo electrical signals having magnitudes greater than a determined threshold level thereby reducing the magnitude of electricity applied to said record medium via the stylus means thereof so that the shade of bottom echo indications on said echogram is lighter than and distinctly contrasted with the shade of floating object echo indications on said echogram, said control means comprising variable impedance means connected between said time delay means and the last of the amplifier stages for amplifying time-delayed electrical signals, said variable impedance means reducing the magnitude of said time-delayed bottom echo electrical signals when the amplified electrical signals corresponding thereto and applied to said control means have magnitudes greater than said determined threshold level, said variable impedance means comprising a transistor having emitter, collector and base electrodes and a resistor connected between said emitter and collector electrodes; and base means connected to the base electrode of said transistor for controlling the conductive condition thereof and for providing a blocking voltage for producing said determined threshold level in said transistor wherein the non-delayed object echo electrical signals and the non-delayed bottom echo electrical signals are applied as an input voltage between the base and emitter electrodes of said transistor and to said time delay means whereby only the threshold level blocking voltage transferred portions of said bottom echo electrical signals control the blocked transistor to its conductive condition and the non-reduced magnitude time-delayed object echo electrical signals and the reduced magnitude time-delayed bottom echo electrical signals nearest their beginning are derived as an output voltage between the emitter and collector electrodes of said transistor, and wherein the time delay means of said contrast control circuit means imposes a time delay having a duration which in cooperation with said base means provides an output voltage which initially increases directly with increasing input voltage and then decreases substantially linearly with further increasing input voltage.

12. Underwater sound apparatus as claimed in claim 11, wherein after decreasing, said output voltage further increases directly with still further increasing input voltage due to said transistor being controlled to its fully conductive condition.

13. Underwater sound apparatus as claimed in claim 12, wherein the conductive condition control of said transistor is selected to provide the decrease of output voltage with further increasing input voltage abruptly and for a short duration prior to the further increase of said output voltage with the still further increasing input voltage.

14. A method of providing an echogram having a clear contrast between indications of floating objects and the bottom of a body of water, comprising the steps of:

receiving object echo signals reflected from floating objects in said body of water and receiving considerably larger magnitude bottom echo signals reflected from the bottom of said body of water;

converting said object echo signals into object echo electrical signals of corresponding magnitudes and said bottom echo signals into bottom echo electrical signals of corresponding magnitude;

moving a record medium responsive to electricity in a direction of motion;

moving a stylus for applying electricity to said record medium in operative proximity with said record medium across said record medium in directions transverse to said direction of motion to provide an echogram indicating in distinct contrast the presence of said floating objects and the bottom of said body of water;

amplifying the object echo and bottom echo electrical signals and applying the amplified electrical signals to said stylus thereby providing an echogram;

providing a determined threshold level;

transferring portions of said amplified electrical signals having magnitudes greater than said determined threshold level;

blocking portions of said amplified electrical signals having magnitudes less than said determined threshold level;

delaying in time the amplified object echo electrical signals and the amplified bottom echo electrical signals in the time the amplified electrical signals require to increase to the determined threshold level to provide time-delayed object echo electrical signals and time-delayed bottom echo electrical signals which are reducible from the beginning of said time-delayed bottom echo electrical signals; and reducing the magnitudes of the time-delayed bottom echo electrical signals nearest their beginning by the transferred non-delayed amplified bottom echo electrical signals having magnitudes greater than said determined threshold level thereby reducing the magnitude of electricity applied to said record medium via the stylus thereof so that the shade of bottom echo indications on said echogram is lighter from its beginning than and distinctly contrasted with the shade of floating object echo indications on said echogram.

References Cited

UNITED STATES PATENTS 3,017,606 1/1962 Kietz et al. ............ 340—3
3,072,882 1/1963 Beebe ................ 340—3

RODNEY D. BENNETT, Jr., *Primary Examiner.*

J. G. BAXTER, *Assistant Examiner.*